(12) United States Patent
Sudai et al.

(10) Patent No.: US 8,242,775 B2
(45) Date of Patent: Aug. 14, 2012

(54) TAMPER-DETECTING ELECTRONIC SYSTEM

(75) Inventors: Rami Sudai, Haifa (IL); Yonatan Shlomovich, Givat Ada (IL); Samuel Katz, Givat Zeev (IL)

(73) Assignee: NDS Limited, Staines, Middlesex (GB)

( * ) Notice: Subject to any disclaimer, the term of this patent is extended or adjusted under 35 U.S.C. 154(b) by 400 days.

(21) Appl. No.: 12/452,916

(22) PCT Filed: Oct. 9, 2007

(86) PCT No.: PCT/IB2007/054113
§ 371 (c)(1),
(2), (4) Date: Mar. 5, 2010

(87) PCT Pub. No.: WO2009/047585
PCT Pub. Date: Apr. 16, 2009

(65) Prior Publication Data
US 2010/0181999 A1  Jul. 22, 2010

(51) Int. Cl.
*G01N 27/72* (2006.01)
(52) U.S. Cl. .................. 324/228; 324/219
(58) Field of Classification Search .......... 324/219, 324/228
See application file for complete search history.

(56) References Cited

U.S. PATENT DOCUMENTS

| | | | |
|---|---|---|---|
| 5,159,629 A | 10/1992 | Double et al. | |
| 5,724,426 A | 3/1998 | Rosenow et al. | |
| 5,910,774 A | 6/1999 | Capriotti et al. | |
| 6,246,970 B1 | 6/2001 | Silverbrook et al. | |
| 6,360,321 B1 | 3/2002 | Gressel et al. | |
| 6,429,640 B1 | 8/2002 | Daughton et al. | |
| 7,005,733 B2 | 2/2006 | Kommerling et al. | |
| 2005/0236683 A1 | 10/2005 | Shapiro et al. | |
| 2006/0081497 A1 | 4/2006 | Knudsen | |

FOREIGN PATENT DOCUMENTS

| | | |
|---|---|---|
| JP | 2002-82135 | 3/2002 |
| JP | 2002-082136 | 3/2002 |
| WO | WO 2005/114733 A1 | 12/2005 |

OTHER PUBLICATIONS

Patrick Briney et al., "The Spin Valve Head (GMR) of the Hard Disk".

(Continued)

*Primary Examiner* — Bot Ledynh
(74) *Attorney, Agent, or Firm* — Husch Blackwell LLP (57) ABSTRACT

An apparatus for detecting tampering with an integrated circuit (IC), the apparatus comprising a second circuit comprising at least one conductor for conducting electrical current, the electrical current comprising, during at least one period of time, current of known strength, the electrical current generating a magnetic field, at least one magnetic field sensing device operatively associated with the IC, the sensing device having at least one electrical characteristic responsive to changes in a sensed magnetic field, the magnetic field sensing device being positioned so as to sense the magnetic field generated by current in the at least one conductor, and an analyzer operatively associated with the at least one magnetic field sensing device and the IC, the analyzer determining that the IC is being tampered with based, at least in part, on changes in the at least one electrical characteristic of the at least one magnetic field sensing device in response to changes in the sensed magnetic field generated by the electrical current in the at least one conductor during the at least one period of time. Related apparatus and methods are also described.

53 Claims, 6 Drawing Sheets

OTHER PUBLICATIONS

Jim Daughton et al., "Giant Magnetoresistance Devices Move in," *The Industrial Physicist*, (American Institute of Physics, Jun. 1999, pp. 22-24).

Teodor Dogaru et al., "Integrated Giant Magnetoresistive Tranducer for Eddy Current Testing" (AIPnD), retrieved from http://www.ndt.net/article/wcndtDD/papers/idn565/idn565.htm.

Shu-Jen Han et al., "CMOS Integrated DNA Microarray Based on GMR Sensors".

Charles M. Kozierok, "Giant Magnetoresistive (GMR) Heads," (The PC Guide, 2004), retrieved from www.pcguide.com/ref/hdd/op/heads/techGMR-c.html.

Benaiah D. Schrag et al., "Magnetic Current Imaging With Magnetic Tunnel Junction Sensors:Case Study and Analysis" (Micro Magnetics Inc.).

C.H. Smith et al., "Eddy-Current Testing With Gmr Magnetic Sensor Arrays" (presented at the Quantitative Nondestructive Evaluation Conference, Green Bay, WI, Jul. 28, 2003, published in Review of Progress in Quantitative Nondestructive Evaluation, vol. 2323, pp. 406-413).

*Application Notes* (NVE Corporation, pp. 105-108).

"Current Measurement Using GMR Sensors" (NVE Corporation, Mar. 2007).

"Field Estimator for a Known Current".

"Flip Chip" (Jun. 14, 2006), retrieved from http://en.wikipedia.org/wiki/Flip_chip.

"Giant Magnetoresistive Effect" (Jan. 11, 2006), retrieved from http://en.wikipedia.org/wiki/Giant_magnetoresistive_effect.

"GMR Sensor Specifications" (Hitachi Metals America, Ltd., 2006), retrieved from mhtml:file://D:\Temporary%20Internet%20Files\OLK21\GMR%20Sensor%20from%2 . . . .

"GMR Sensors" (Hitachi Metals, Ltd., 2006), retrieved from www.hitachi-metals.co.jp/e/prod/prod06/p06_08.html.

"Longitudinal Recording" (Hitachi Global Storage Technologies, 2005), retrieved from www.pctechguide.com/31HardDisk_Longitudinal_recording.htm.

"Low Field Sensing" (NVE Corporation, 2007), retrieved from www.nve.com/lowFieldSensing.php.

"Magnetic Sensor applications Workgroup," retrieved from gdev.boulder.hist.gov/817.03/whatwedo/magsensors/.

"Method to Integrate the GMR Sensor Into the SC Chip".

"Micromen Technologies," Inside Chips.Ventures (Jan. 2006, pp. 17-18).

"Sensors: GMR Sensors (Magnetic Encoders)" (Hitachi Metals America, Ltd., 2006).

"Spin Transistor" (Feb. 26, 2007), retrieved from http://en.wikipedia.org/wiki/Spin_transistor.

"Spintronics" (May 7, 2007), retrieved from http://en.wikipedia.org/wiki/Spintronics.

"Wheatstone Bridge" (Jun. 20, 2006), retrieved from http://en.wikipedia.org/wiki/Wheatstone_bridge.

May 19, 2011 Office Communication in connection with prosecution of EP 07 826 698.8.

TAMPER-DETECTING ELECTRONIC SYSTEM

RELATED APPLICATION INFORMATION

The present application is a 35 USC §371 application of PCT/IB/2007/054113, filed on 9 Oct. 2007 and entitled "TAMPER-DETECTING ELECTRONIC SYSTEM", which was published on 16 Apr. 2009 in the English language with International Publication Number WO 2009/047585 A1.

FIELD OF THE INVENTION

The present invention relates to electronic systems which comprise electronic sub-systems designed to detect tampering with the electronic systems.

BACKGROUND OF THE INVENTION

Security integrated circuits, commonly known as "security chips", are often used to protect information, data transmissions, access control, or value (typically monetary). Data in security chips is typically protected through the use of secure memory and/or the secure transmission of data using cryptographic techniques implemented on chip. Some applications for security chips include: banking cards, television conditional access system cards, premises access control cards, personal identity cards, USB flash drives and automobile keys.

"Crackers", people who use their expertise to illegally break into secure programs and systems, have been known to remove security chips from their packaging and then to connect the security chips to suitable electrical connections in such a way that the chips remains operational. In this fashion the crackers can more easily study and reverse engineer operating security chips, thereby greatly compromising the security of the security chips. The terms "crack" and "hack," in their various grammatical forms, are used interchangeably in the present application.

Various methods of invasive attack on chips are known in the art, whereby crackers, criminals, and others try to obtain, change, or use secret information on the chips. There are also various methods known in the art, which attempt to protect chips from these various forms of invasive attack. Most such known protection methods are easily circumventable by those skilled in the art of cracking.

The following references provide general background in the field of the invention:

U.S. Pat. No. 5,159,629 to Double et al;
U.S. Pat. No. 5,910,774 to Capriotti et al;
U.S. Pat. No. 6,360,321 to Gressel et al;
U.S. Pat. No. 6,429,640 to Daughton et al;
U.S. Pat. No. 7,005,733 to Kommerling et al;
US Published Patent Application US20050236683 of Shapiro et al;
US Published Patent Application US20060081497 of Knudsen et al;
Japan Published Patent Application JP2002082135 of Yazaki Corp;
Japan Published Patent Application JP2002082136 of Yazaki Corp;
PCT Published Patent Application WO 05/114733 of NDS Ltd and corresponding U.S. patent application Ser. No. 10/593,386 www.nve.com/Downloads/apps.pdf
qdev.boulder.nist.gov/817.03/whatwedo/magsensors/Dave-%20Magnetic %20 Sensor %20Applications %20 Workgroup.doc
"CMOS Integrated DNA Microarray Based on GMR Sensors", Shu-Jen Han, Liang X U, Heng Yu, et al
www.pcguide.com/ref/hdd/op/heads/techGMR-c.html The disclosures of all references mentioned above and throughout the present specification, as well as the disclosures of all references mentioned in those references, are hereby incorporated herein by reference.

SUMMARY OF THE INVENTION

The present invention, in certain embodiments thereof, seeks to provide an improved apparatus and method for detecting and/or defending against attempts to tamper with an integrated circuit (IC).

Tampering with an IC is often performed to facilitate hacking or reverse engineering, the purpose of which is an analysis of the structure, function, memory contents and operation of the IC. One method of such tampering involves eliminating or detaching, partially or completely, components to which the IC is operatively connected and thereafter operating the IC.

In order to detect and/or defend against such tampering, some of the embodiments of the present invention comprise a second circuit comprising at least one conductor for conducting electrical current, the electrical current comprising, during at least one period of time, current of known strength, the electrical current generating a magnetic field. The embodiments also comprise at least one magnetic field sensing device operatively associated with the IC, said sensing device having at least one electrical characteristic responsive to changes in a sensed magnetic field, said magnetic field sensing device being positioned so as to sense the magnetic field generated by current in the at least one conductor. In addition, the embodiments also comprise an analyzer operatively associated with said at least one magnetic field sensing device and the IC, said analyzer determining that the IC is being tampered with based, at least in part, on changes in the at least one electrical characteristic of said at least one magnetic field sensing device in response to changes in said sensed magnetic field generated by the electrical current in the at least one conductor during said at least one period of time.

By way of non-limiting examples, the strength of the sensed magnetic field can be affected by changing the current flow in the one or more conductors comprised in the second circuit, altering the one or more conductors comprised in the second circuit, or by changing the proximity of the one or more conductors comprised in the second circuit to the one or more magnetic field sensing devices.

In some of the embodiments described, upon determination that tampering has occurred, the IC takes defensive measures, such as, by way of a non-limiting example, altering its mode of operation from a normal mode to an alternate mode. Additional examples are disclosed in the detailed description of embodiments of the invention and as claimed. Other examples of defensive measures include measures known in the art such as those incorporated herein by reference.

There is thus provided in accordance with an embodiment of the present invention an apparatus for detecting tampering with an integrated circuit (IC), the apparatus comprising a second circuit comprising at least one conductor for conducting electrical current, the electrical current comprising, during at least one period of time, current of known strength, the electrical current generating a magnetic field, at least one magnetic field sensing device operatively associated with the IC, said sensing device having at least one electrical characteristic responsive to changes in a sensed magnetic field, said magnetic field sensing device being positioned so as to sense the magnetic field generated by current in the at least one conductor, and an analyzer operatively associated with said at least one magnetic field sensing device and the IC, said analyzer determining that the IC is being tampered with based, at least in part, on changes in the at least one electrical characteristic of said at least one magnetic field sensing device in response to changes in said sensed magnetic field generated by the electrical current in the at least one conductor during said at least one period of time.

Further in accordance with an embodiment of the present invention, the electrical current further comprises, during at least a second period of time, current of unknown strength.

Still further in accordance with an embodiment of the present invention, said determining is based, at least in part, on said changes differing from predetermined values.

Still further in accordance with an embodiment of the present invention, said determining is based, at least in part, on said changes exceeding a predetermined threshold.

Additionally in accordance with an embodiment of the present invention, said determining is based, at least in part, on data generated by other tamper detection sensing devices.

Moreover in accordance with an embodiment of the present invention, the second circuit is operatively associated with the IC and the strength of the electrical current of known strength is controlled by the IC.

Also provided in accordance with an embodiment of the present invention, the electrical current of known strength varies in a time-dependent fashion.

Also provided in accordance with an embodiment of the present invention, said analyzer further comprises a differentiator operative to differentiate between sensed background magnetic fields and sensed magnetic fields generated by the electrical current of known strength in the at least one conductor, wherein said differentiation is based, at least in part, on the time dependent variation of the electrical current of known strength.

Moreover in accordance with an embodiment of the present invention, the electrical current of known strength is constant.

Further in accordance with an embodiment of the present invention, the at least one magnetic field sensing device comprises a plurality of magnetic field sensing devices, said analyzer being operatively associated with said multiple magnetic field sensing devices and wherein said analyzer determines that the IC is being tampered with based, at least in part, on changes in the at least one electrical characteristic of said multiple magnetic field sensing devices in response to changes in said sensed magnetic fields generated by the electrical current in the at least one conductor during said at least one period of time.

Additionally in accordance with an embodiment of the present invention, the at least one conductor comprises a plurality of conductors.

Additionally in accordance with an embodiment of the present invention, at least one of said multiple magnetic field sensing devices senses background magnetic fields and said analyzer further comprises a differentiator operative to differentiate between sensed background magnetic fields and sensed magnetic fields generated by the electrical current in the at least one conductor, during said at least one period of time, using said at least one sensing device sensing background magnetic fields, wherein said differentiation is performed using the at least one electrical characteristic of said at least one sensing device sensing background magnetic fields.

Moreover in accordance with an embodiment of the present invention, the at least one magnetic field sensing device is selected from the group consisting of a hall effect sensor, a GMR sensor, a spin transistor based sensor, and a magnetic tunnel junction sensor.

Further in accordance with an embodiment of the present invention, the at least one magnetic field sensing device is manufactured separately from the IC and subsequently mounted on a surface of the IC.

Further in accordance with an embodiment of the present invention, the at least one magnetic field sensing device is integrally manufactured within the IC.

Still further in accordance with an embodiment of the present invention, the at least one conductor provides supply current to the IC.

Still further in accordance with an embodiment of the present invention, the at least one conductor provides a signal to the IC.

Moreover in accordance with an embodiment of the present invention, the IC takes at least one defensive measure in response to said analyzer determining that the IC is being tampered with.

Further in accordance with an embodiment of the present invention, said at least one defensive measure is selected from the group consisting of:
  a) the IC not entering a normal operation mode;
  b) shutting down some or all operation of the IC;
  c) disabling the IC;
  d) not distributing a clock signal to the IC;
  e) erasing at least a first part of data stored in the IC;
  f) making at least a second part of data stored in the IC inaccessible;
  g) the IC providing nonsense data to be read out, replacing, at least in part, valid data to be read out;
  h) the IC continuing to operate normally, subtly altering stored data, at least in part, thereby functioning as a silent alarm;
  i) the IC setting an indicator, by storing a value in the IC, indicating that the analyzer produced a signal indicating detection of movement of the IC relative to the second circuit; and
  j) the IC setting an indicator, by blowing a fuse in the IC, indicating that the analyzer produced a signal indicating detection of movement of the IC relative to the second circuit.

Additionally in accordance with an embodiment of the present invention, the IC is a bare die.

Additionally in accordance with an embodiment of the present invention, the IC is a packaged die.

Further in accordance with an embodiment of the present invention, said second circuit is selected from the group consisting of:
  a) a smartcard substrate;
  b) a hybrid substrate;
  c) an element in a multi-chip module;
  d) a printed circuit board; and
  e) an electrically conducting material.

Yet further in accordance with an embodiment of the present invention, the IC is physically attached to a supporting member.

Moreover in accordance with an embodiment of the present invention, said supporting member comprises said second circuit.

Still further in accordance with an embodiment of the present invention, the IC is physically attached using an attachment method selected from the group consisting of:

a) thermal bonding;
b) soldering;
c) ultrasonic bonding; and
d) adhesive bonding.

Additionally in accordance with an embodiment of the present invention, the IC is physically attached face up.

Additionally in accordance with an embodiment of the present invention, the IC is physically attached face down.

Further in accordance with an embodiment of the present invention, the IC is encapsulated by an encapsulation comprising said second circuit.

Further in accordance with an embodiment of the present invention, the IC is not encapsulated by an encapsulation comprising said second circuit.

There is further provided in accordance with an embodiment of the present invention a method for detecting tampering with an integrated circuit (IC), the method comprising providing an electrical current in at least one conductor in a second circuit, the electrical current being of known strength during at least one period of time, the electrical current generating a magnetic field, sensing the magnetic field generated by current in the at least one conductor, and determining that the IC is being tampered with based on changes in said sensed magnetic field generated by the electrical current in the at least one conductor during said at least one period of time.

Further in accordance with an embodiment of the present invention, the electrical current further comprises, during at least a second period of time, current of unknown strength.

Still further in accordance with an embodiment of the present invention, said determining is based, at least in part, on said changes differing from predetermined values.

Still further in accordance with an embodiment of the present invention, said determining is based, at least in part, on said changes exceeding a predetermined threshold.

Additionally in accordance with an embodiment of the present invention, said determining is based, at least in part, on data generated by other tamper detection sensing devices.

Moreover in accordance with an embodiment of the present invention, enabling the IC to control the strength of said electrical current of known strength.

Also provided in accordance with an embodiment of the present invention, varying the electrical current of known strength in a time-dependent fashion.

Also provided in accordance with an embodiment of the present invention, said determining further comprising differentiating between sensed background magnetic fields and sensed magnetic fields generated by the electrical current, wherein said differentiation is based, at least in part, on the time dependent variation of the electrical current during said at least one period of time.

Moreover in accordance with an embodiment of the present invention, the electrical current of known strength is constant.

Further in accordance with an embodiment of the present invention, sensing in a plurality of locations, and said determining is based on changes in said sensed magnetic field generated by the electrical current in the at least one conductor sensed at said plurality of locations during said at least one period of time.

Additionally in accordance with an embodiment of the present invention, the at least one conductor comprises a plurality of conductors.

Additionally in accordance with an embodiment of the present invention, said determining further comprising differentiating between sensed background magnetic fields and sensed magnetic fields generated by the electrical current, wherein said differentiation is based, at least in part, on said sensing in a plurality of locations including sensing background magnetic fields during said at least one period of time.

Moreover in accordance with an embodiment of the present invention, further comprising the at least one conductor providing supply current to the IC.

Moreover in accordance with an embodiment of the present invention, further comprising the at least one conductor providing a signal to the IC.

Additionally in accordance with an embodiment of the present invention, comprising taking at least one defensive measure in response to determining that the IC is being tampered with.

There is further provided in accordance with an embodiment of the present invention a tamper detecting system comprising an integrated circuit (IC), a second circuit comprising at least one conductor for conducting electrical current, the electrical current comprising, during at least one period of time, current of known strength, the electrical current generating a magnetic field, at least one magnetic field sensing device operatively associated with the IC, said sensing device having at least one electrical characteristic responsive to changes in a sensed magnetic field, said magnetic field sensing device being positioned so as to sense the magnetic field generated by current in the at least one conductor, and an analyzer operatively associated with said at least one magnetic field sensing device and the IC, said analyzer determining that the IC is being tampered with based, at least in part, on changes in the at least one electrical characteristic of said at least one magnetic field sensing device in response to changes in said sensed magnetic field generated by the electrical current in the at least one conductor during said at least one period of time.

Further in accordance with an embodiment of the present invention, the electrical current further comprises, during at least a second period of time, current of unknown strength.

Still further in accordance with an embodiment of the present invention, said determining is based, at least in part, on said changes differing from predetermined values.

Still further in accordance with an embodiment of the present invention, said determining is based, at least in part, on said changes exceeding a predetermined threshold.

Additionally in accordance with an embodiment of the present invention, said determining is based, at least in part, on data generated by other tamper detection sensing devices.

Moreover in accordance with an embodiment of the present invention, the second circuit is operatively associated with the IC and the strength of the electrical current of known strength is controlled by the IC.

Also provided in accordance with an embodiment of the present invention, the electrical current of known strength varies in a time-dependent fashion.

Moreover in accordance with an embodiment of the present invention, said analyzer further comprises a differentiator operative to differentiate between sensed background magnetic fields and sensed magnetic fields generated by the electrical current of known strength in the at least one conductor, wherein said differentiation is based, at least in part, on the time dependent variation of the electrical current of known strength.

Further in accordance with an embodiment of the present invention, the electrical current of known strength is constant.

Additionally in accordance with an embodiment of the present invention, the at least one magnetic field sensing device comprises a plurality of magnetic field sensing devices, said analyzer being operatively associated with said multiple magnetic field sensing devices and wherein said analyzer determines that the IC is being tampered with based, at least in part, on changes in the at least one electrical characteristic of said multiple magnetic field sensing devices in response to changes in said sensed magnetic fields generated by the electrical current in the at least one conductor during said at least one period of time.

Additionally in accordance with an embodiment of the present invention, the at least one conductor comprises a plurality of conductors.

Moreover in accordance with an embodiment of the present invention, wherein at least one of said multiple magnetic field sensing devices senses background magnetic fields and said analyzer further comprises a differentiator operative to differentiate between sensed background magnetic fields and sensed magnetic fields generated by the electrical current in the at least one conductor, during said at least one period of time, using said at least one sensing device sensing background magnetic fields, wherein said differentiation is performed using the at least one electrical characteristic of said at least one sensing device sensing background magnetic fields.

Further in accordance with an embodiment of the present invention, wherein the at least one magnetic field sensing device is selected from the group consisting of a hall effect sensor, a GMR sensor, a spin transistor based sensor, and a magnetic tunnel junction sensor.

Further in accordance with an embodiment of the present invention, wherein the at least one magnetic field sensing device is manufactured separately from the IC and subsequently mounted on a surface of the IC.

Still further in accordance with an embodiment of the present invention, wherein the at least one magnetic field sensing device is integrally manufactured within the IC.

Still further in accordance with an embodiment of the present invention, wherein the at least one conductor provides supply current to the IC.

Moreover in accordance with an embodiment of the present invention, wherein the at least one conductor provides a signal to the IC.

Further in accordance with an embodiment of the present invention, wherein the IC takes at least one defensive measure in response to said analyzer determining that the IC is being tampered with.

Additionally in accordance with an embodiment of the present invention, wherein said at least one defensive measure is selected from the group consisting of:
a) the IC not entering a normal operation mode;
b) shutting down some or all operation of the IC;
c) disabling the IC;
d) not distributing a clock signal to the IC;
e) erasing at least a first part of data stored in the IC;
f) making at least a second part of data stored in the IC inaccessible;
g) the IC providing nonsense data to be read out, replacing, at least in part, valid data to be read out;
h) the IC continuing to operate normally, subtly altering stored data, at least in part, thereby functioning as a silent alarm;
i) the IC setting an indicator, by storing a value in the IC, indicating that the analyzer produced a signal indicating detection of movement of the IC relative to the second circuit; and
j) the IC setting an indicator, by blowing a fuse in the IC, indicating that the analyzer produced a signal indicating detection of movement of the IC relative to the second circuit.

Further in accordance with an embodiment of the present invention, wherein the IC is a bare die.

Yet further in accordance with an embodiment of the present invention, wherein the IC is a packaged die.

Moreover in accordance with an embodiment of the present invention, wherein said second circuit is selected from the group consisting of:
a) a smartcard substrate;
b) a hybrid substrate;
c) an element in a multi-chip module;
d) a printed circuit board; and
e) an electrically conducting material.

Still further in accordance with an embodiment of the present invention, wherein the IC is physically attached to a supporting member.

Additionally in accordance with an embodiment of the present invention, wherein said supporting member comprises said second circuit.

BRIEF DESCRIPTION OF THE DRAWINGS

The present invention will be understood and appreciated more fully from the following detailed description, taken in conjunction with the drawings in which:

FIG. 4 is a schematic cross-sectional illustration of a magnetic field sensing device 105 constructed and operative in accordance with an embodiment of the present invention, in which FIG. 4A schematically depicts the sensor 105 prior to placement on the IC 100, and FIG. 4B schematically depicts the sensor 105 after placement on the IC 100.

DETAILED DESCRIPTIONS OF EMBODIMENTS

Figure 1:
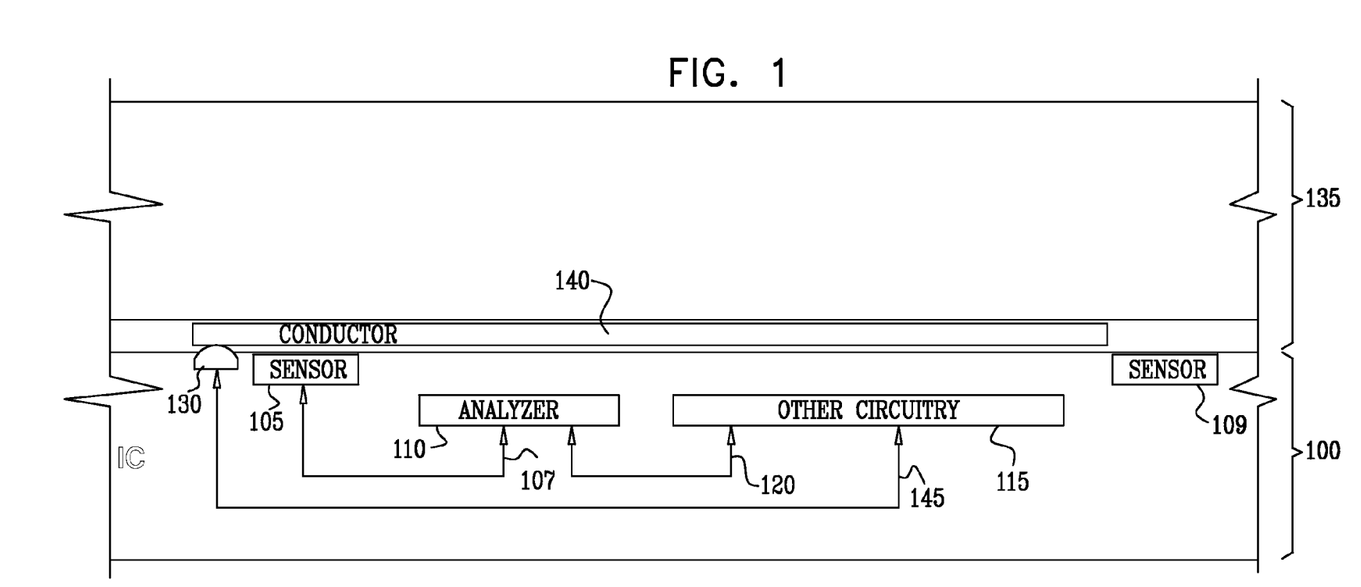
FIG. 1 is a schematic cross-sectional illustration of an integrated circuit (IC) 100 constructed and operative in accordance with an embodiment of the present invention, the IC being in operative electrical association with a second circuit 135.

Reference is now made to FIG. 1, which is a schematic cross-sectional illustration of an integrated circuit (IC) 100 constructed and operative in accordance with an embodiment of the present invention, the IC being in operative electrical association with a second circuit 135.

The apparatus of FIG. 1 comprises an IC 100 and a second circuit 135. The IC 100, of the present example, comprises at least one magnetic field sensing device 105, a background magnetic field sensing device 109, an analyzer 110, and other circuitry 115.

The analyzer 110 is in operative association, via an electrically conducting connection 107, with the at least one magnetic field sensing device 105.

The other circuitry 115 is in operative association with the analyzer 110 via an electrically conducting connection 120.

The apparatus of FIG. 1 additionally comprises a second circuit 135 not comprised in the IC 100. In an embodiment of the invention, the second circuit 135 is in operative association with the other circuitry 115. The operative association of the other circuitry 115 with the second circuit 135 is, in this example, achieved by an electrically conducting connection 145 from the other circuitry 115 to a bond pad 130 of the IC 100, and by the bond pad 130 being bonded and electrically connected to an electrical conductor 140 comprised in the second circuit 135.

A background magnetic field sensing device 109, not proximate to the electrical conductor 140, is depicted. Sensing device 109 will be described in regard to other embodiments in the present application.

The operation of the apparatus of FIG. 1 is now described. In an embodiment of the invention, under normal operating conditions, the second circuit 135 is operationally electrically associated with the IC 100. An electrical current 215 typically flows through the electrical conductor 140. The electrical current 215 is supplied by an external source, not shown. In some embodiments of the present invention, the second circuit 135 provides supply current to the IC 100 through the electrical conductor 140. Since the electrical conductor 140 typically has an electric current 215 flowing therethrough, the electrical conductor 140 typically produces a magnetic field (not shown).

The magnetic field sensing device 105 has an electrical property which is based, at least in part, on a sensed magnetic field. The magnetic field sensing device 105 is positioned so as to sense the magnetic field generated by electric current 215 in the electrical conductor 140.

An embodiment of the present invention uses a GMR sensing device as the magnetic field sensing device. Persons skilled in the art will appreciate that for a GMR sensor the resistance of the GMR is the electrical property of the above-mentioned magnetic field sensing device 105. In other embodiments of the invention, the GMR sensor could be replaced by a spin transistor based sensing device, magnetic tunnel junction sensor, a hall-effect sensor or any other appropriate magnetic field sensing device known in the art.

During at least one period of time, the electrical current 215 conducted by the electrical conductor 140 is of known strength. In embodiments of the invention where the second circuit 135 provides supply current to the IC 100 through the electrical conductor 140, the strength of the electrical current 215 is dependent on the current drain of the other circuitry 115. In these embodiments, during the at least one period of time, the IC is operated in a predetermined mode, thereby controlling the current drain of the other circuitry 115 in a known manner. It is not necessary for the apparatus of the embodiments of the invention to know the numeric value of the strength of the electric current 215. In other embodiments, during at least a second period of time, the strength of the electric current 215 in the electrical conductor 140 is of unknown strength. The current of known strength, during said one period of time may be either constant or varying in a time-dependent fashion.

It is further appreciated that the magnetic field produced by the electrical current 215 through the electrical conductor 140 as measured by the magnetic field sensing device 105 is also preferably known during the at least one period of time. The strength is known based on calibration measurements that are performed, for example, upon initialization of the apparatus or other situations as enabled by the system designer. The calibration can be performed under the control of the IC or under external control. In a non-limiting example, upon system initialization the IC initiates a calibration routine during which, for a calibration period of time, a current of known strength flows through the at least one conductor. The analyzer records in write-once memory the value of the at least one electrical characteristic of the at least one magnetic field sensing device during the calibration period, said value being the predetermined value to be used by the analyzer as described below.

As would be easily understood by one of average skill in the art, the recording of the value of the at least one electrical characteristic of the at least one magnetic field sensing device during the calibration period can be performed by the IC or an external device and the memory the value is recorded in can be of any appropriate type, such as, for example, SRAM, PROM, EEPROM, and MRAM. Further changes to the calibration value can be prevented through writing a single non-rewritable bit indicating that calibration had already been performed. A copy of the calibration value could be stored in encrypted form in the IC 100 to prevent tampering with the value. The IC 100 could validate the calibration values at various times to detect tampering.

In an embodiment of the present invention, during normal operation of the apparatus, the analyzer 110 determines that the IC 100 is being tampered with based, at least in part, on changes in the at least one electrical characteristic of said at least one magnetic field sensing device 105 in response to changes in said sensed magnetic field generated by the electrical current 215 in the at least one conductor 140 during said at least one period of time. The analyzer compares the value stored during the calibration period with the value of the at least one electrical characteristic of the at least one magnetic field sensing device during the at least one period of time.

The determination by the analyzer can be performed at any time that the apparatus is operational. In an embodiment of the invention, the determination is performed at power-up. In another embodiment, the determination is performed at various times during normal operation of the apparatus, by way of non-limiting examples: at predetermined intervals; at random intervals; or upon the performance of certain predetermined tasks by the apparatus such as for example memory reads or writes of certain locations.

In an embodiment of the invention, if the electrical property of the magnetic field sensing device 105 differs from the predetermined values, the analyzer 110 determines that the IC 100 is being tampered with.

In a further embodiment of the invention, if the electrical property of the magnetic field sensing device 105 changes by an amount exceeding a predetermined threshold, the analyzer 110 determines that the IC 100 is being tampered with.

In other embodiments the analyzer may be further provided data generated by other tamper detection sensing devices. Examples of other IC tamper detection sensing devices known in the art have been incorporated herein by reference and include, but are not limited to, light detectors, radiation detectors, and electrical continuity sensors.

In further embodiments, upon the analyzer determining that the IC is being tampered with, the IC can take one or more defensive measures. In the embodiment shown in FIG. 1, the analyzer 110 sends a signal to the other circuitry 115 indicating to the other circuitry to respond to the attempted tampering. Possible defensive measures, by way of non-limiting example, include:
 a) the IC not entering a normal operation mode;
 b) shutting down some or all operation of the IC;
 c) disabling the IC;
 d) not distributing a clock signal to the IC;
 e) erasing at least a first part of data stored in the IC;
 f) making at least a second part of data stored in the IC inaccessible;

g) the IC providing nonsense data to be read out, replacing, at least in part, valid data to be read out;

h) the IC continuing to operate normally, subtly altering stored data, at least in part, thereby functioning as a silent alarm;

i) the IC setting an indicator, by storing a value in the IC, indicating that the analyzer produced a signal indicating detection of movement of the IC relative to the second circuit; and j) the IC setting an indicator, by blowing a fuse in the IC, indicating that the analyzer produced a signal indicating detection of movement of the IC relative to the second circuit.

Other examples of defensive measures are known in the art.

It is appreciated that a pre-determined change of the electrical property, which causes the analyzer 110 to determine that the IC 100 is being tampered with, is a change corresponding to any of: a change in proximity of the electrical conductor 140 relative to the magnetic field sensing device 105; a change in the physical profile of the conductor 140, such as would occur through modification or attempted bypassing of the electrical conductor 140 with another electrical conductor; and a change in the strength of the electric current 215 conducted in the electrical conductor 140. Attempts to change the physical profile of the conductor 140, such as by bypassing the conductor 140 with another electrical conductor to facilitate tampering, would also likely lead to a detectable change in the electrical property of the magnetic field sensing device 105.

It is appreciated that if, at any time, whether immediately following power up or during normal operation, an alarm condition is indicated, the existence of the alarm condition may be recorded in the IC 100, for example, and without limiting the generality of the foregoing, by storing a value in the IC 100 or by blowing a fuse comprised in the IC 100. The above-mentioned record of an alarm condition is preferably used by the IC 100 to prevent the IC 100 from returning to normal operation even after the above-mentioned change of the electrical property no longer exists.

It is appreciated that, in a preferred embodiment of the present invention, the IC 100 can have more than one magnetic field sensing device 105; such a preferred embodiment is described in more detail below with reference to FIGS. 2A-2C. When more than one magnetic field sensing device 105 is comprised in the IC 100, each one of the magnetic field sensing devices 105 is operatively connected to one or more analyzers 110. The IC 100 is, for example, thereby operative to detect when the proximity of one portion of the second circuit 135 is changed relative to IC 100, even if the proximity of a second portion of the second circuit 135 remains unchanged relative to IC 100.

In an embodiment of the invention, IC 100 and the second circuit 135 are bonded to each other using flip chip technology, as is well known in the art. Flip chip technology is the direct electrical connection of face-down (hence, "flipped") electronic components onto substrates, circuit boards, or carriers, by using conductive "bumps" on IC bond pads. The "bump" of the bond pad 130 is the electrically conducting connection of the IC 100 to the second circuit 135. The bonding method for flip chips is typically ultrasonic. Persons skilled in the art will appreciate that the IC 100 and the second circuit 135 may be connected other than by flip chip technology, but regardless of which technology is used, it is preferable that the magnetic field sensing device 105 be close to the electrical conductor 140 which is producing the magnetic field to be sensed.

In an embodiment of the invention, the second circuit 135 is not operatively connected to the IC 100. Rather, the apparatus is designed such that the non-operatively connected second circuit 135 is positioned with conductors 140 proximate the magnetic field sensing devices 105 such that the apparatus is operative. In such a system, the electric current 215 strength in the conductors 140 is controlled externally, but in synchronization with the operation of the IC 100 such that calibration and determination of tampering by the analyzer 110 can be effectively accomplished. In this embodiment the IC 100 is physically attached to a supporting member other than the second circuit 135.

The IC 100 is typically physically attached to a supporting member using attachment methods of, for example, thermal bonding, soldering, ultrasonic bonding, or adhesive bonding. The IC 100, which can be a bare die or packaged die, may be, for example, contained within/on a smart-card, mounted to a hybrid, mounted in a multi-chip module (MCM) including chip-stacks and flip-chip designs, or be mounted on a printed circuit board. Embodiments of the invention include those in which the IC 100 is attached to the supporting member face up or face down. Face down is when the top layer of the IC 100 is proximate to the supporting member, such as is the case, for example, when using flip chip technology to attach the IC 100 to a supporting member. Face up is when the top layer of the IC 100 is facing away from the supporting member, such as is the case, for example, when using ball grid array technology to attach the IC 100 to a supporting member.

Other embodiments of the invention include those in which the second circuit 135 is comprised in or on a cover positioned over the IC 100, which causes the IC 100 to be closed in on all sides such that the IC 100 is encapsulated by an encapsulation comprising the second circuit 135. Examples are when the IC 100 is mounted in a well on a hybrid and the second circuit 135 forms the cover of the well, or when the IC 100 is mounted on a printed circuit board and the second circuit 135 forms a three dimensional cover which is place over the circuit, with operative connections formed between the electrical conductors 140 and conductors on the printed circuit board. In yet other embodiments the second circuit 135 is not so comprised, such that the IC 100 is not encapsulated by an encapsulation comprising the second circuit 135.

The second circuit 135 can comprise, by way of non-limiting example: a smartcard substrate; a hybrid substrate; an element in a multi-chip module; a printed circuit board; or an electrically conducting material, such as, for example, a strip of formed metal or other conducting material.

As a non-limiting example, the at least one magnetic field sensing devices 105 could be GMR sensors of the spin valve type used commonly in hard drives, as described in references that are herein incorporated and as shown in FIG. 4.

Figure 4A:
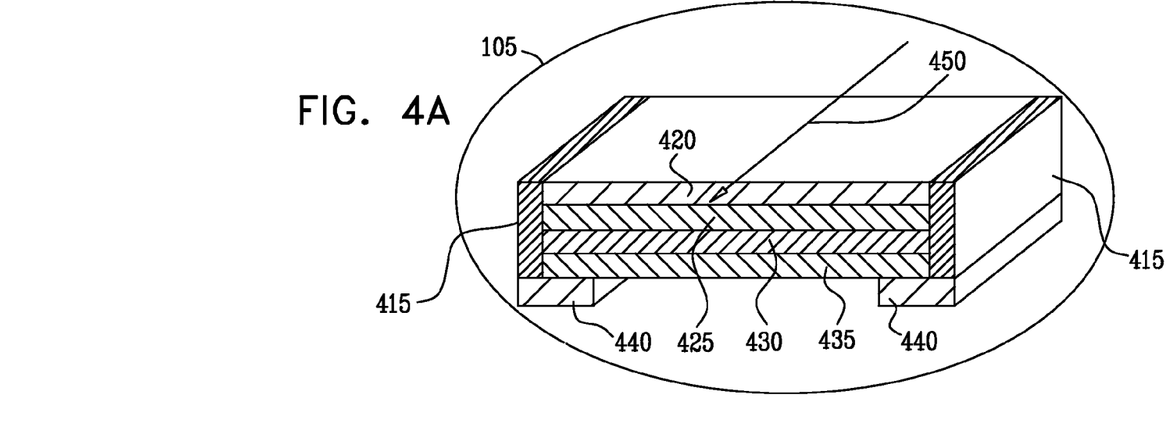
Figure 4B:
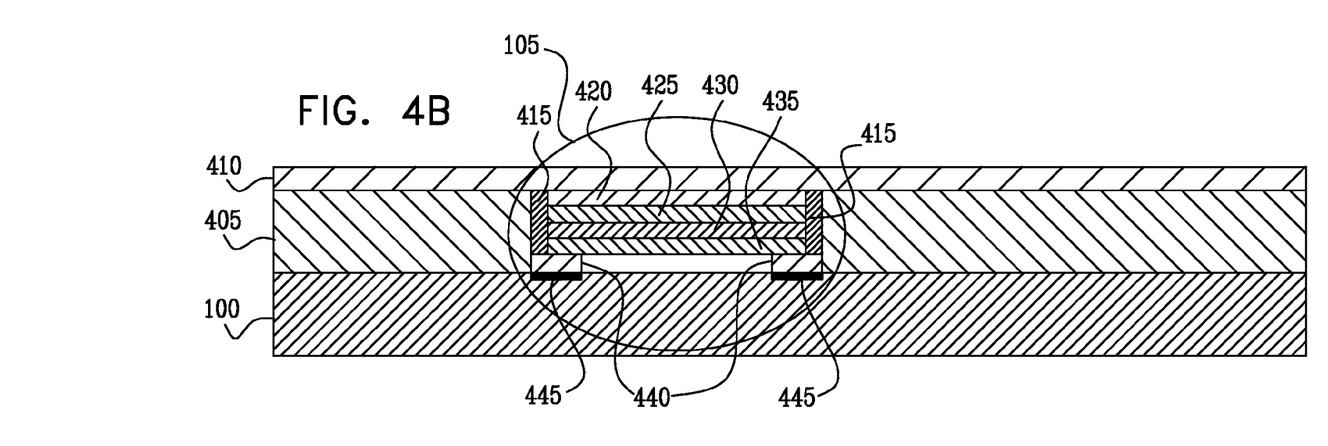

Reference is now made to FIG. 4, which is a schematic cross-sectional illustration of a magnetic field sensing device 105 constructed and operative in accordance with an embodiment of the present invention. FIG. 4A schematically depicts the sensor 105 prior to placement on the IC 100. FIG. 4B schematically depicts the sensor 105 after placement on the IC 100.

The magnetic field sensing device 105 depicted in FIG. 4A and FIG. 4B is a GMR sensor of the spin valve type, which is a device consisting of two or more conducting magnetic materials, that alternates its electrical resistance (from low to high or high to low) depending on the alignment of the magnetic layers. The magnetic layers of the device align "up" or "down" depending on an external magnetic field. Layers are made of two materials with different hysteresis curves so one layer ("soft" layer) changes polarity while the other ("hard"

layer) keeps its polarity. Spin valves work because of a quantum property of electrons (and other particles) called spin. When a magnetic layer is polarized, the unpaired carrier electrons align their spins to the external magnetic field. When a potential exists across a spin valve, the spin-polarized electrons keep their spin alignment as they move through the device. If these electrons encounter a material with a magnetic field pointing in the opposite direction, they have to flip spins to find an empty energy state in the new material. This flip requires extra energy which causes the device to have a higher resistance than when the magnetic materials are polarized in the same direction.

In FIG. 4A and FIG. 4B, the pinned layer 425, which is the hard layer, and the sensing layer 435, which is the soft layer, are the conducting magnetic materials discussed previously. The pinned layer 425, typically of cobalt material, is held in a fixed magnetic orientation by virtue of its adjacency to the exchange layer 420. The exchange layer 420 is made of an antiferromagnetic material, typically constructed from iron and manganese. The remaining layer is a spacer layer 430, which is nonmagnetic, typically made from copper, and placed between the sensing layer 435 and pinned layer 425 to separate them magnetically. A Hard bias material 415 comprising, for example, cobalt, platinum and chromium is depicted.

In FIG. 4B sensor contacts 440 are positioned opposite IC 100 contacts 445. A silicon dioxide layer 405 is depicted which covers the IC 100. A protective silicon dioxide layer 410, formed after the positioning of the sensor 105 on the surface of the IC 100 is also depicted. Alternatively, as known in the art, the order of the layers 420, 425, 430, 435 could be reversed (not shown) so that the sensing layer 435 is closest to the protective silicon dioxide layer 410.

In FIG. 4A the axis of sensitivity 450 is depicted. The direction of the axis of sensitivity is dependent on the pinned film layer and the exchange layer, as is well known in the art.

Many other GMR structures, with varying component materials, are known in the art. It is understood that any appropriate magnetic field sensing device 105 can be substituted for the example depicted in FIG. 4A and FIG. 4B and discussed above.

In an embodiment of the present invention the magnetic field sensing device 105 is manufactured separately from the IC 100 and subsequently mounted on the surface of the IC 100 using techniques well known in the art. As a non-limiting example, a GMR sensor could be incorporated on the surface of the IC 100 with contacts from the sensing device to the IC 100 comprised in the top metal layer layout with the sensing device positioned within a well in the top SiO2 layer. The sensing device can be mounted to either the top or bottom surface of the IC depending on the application. If, by way of non-limiting example, the IC is bonded to the second circuit 135 using flip-chip technology then the sensing device would preferably be mounted to the top surface of the IC 100. If, by way of further non-limiting example, the IC 100 is in packaged form and is bonded to the second circuit 135 using ball grid array technology then the sensing devices 105, also in packaged form, would preferably be mounted to the bottom surface of the IC 100. Packaging comprises any of packaging in plastic, ceramic, potting material and all other appropriate materials known in the art.

In an alternative embodiment of the present invention the magnetic field sensing device 105 is integrally manufactured within IC 100 using techniques well known in the art. See, for example, "CMOS Integrated DNA Microarray Based on GMR Sensors", Shu-Jen Han, Liang X U, Heng Yu, et al, which was previously incorporated herein by reference In a further alternate embodiment of the present invention the magnetic field sensing device 105 is a discrete component operatively associated with the IC 100. In such an embodiment, the sensing devices 105 could, by way of non-limiting example, be mounted on a hybrid or PCB along the perimeter of the IC 100. The analyzer 110 in this embodiment is preferably incorporated within the IC 100.

Figure 2A:
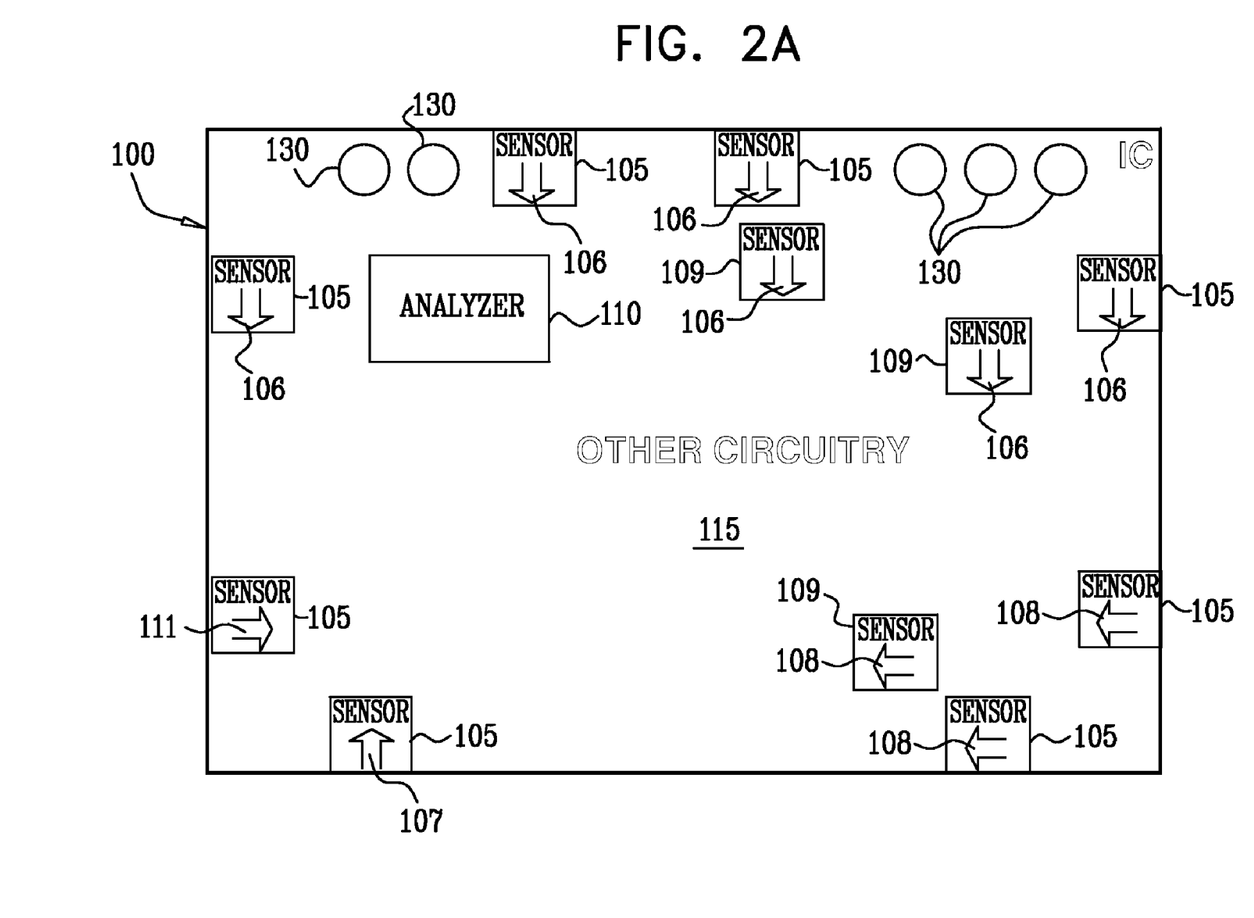
FIG. 2A is a simplified top view illustration of the IC 100 constructed and operative in accordance with an embodiment of the present invention.

Reference is now made to FIG. 2A, which is a simplified top view illustration of the IC 100 constructed and operative in accordance with an embodiment of the present invention.

FIG. 2A depicts the following components which are comprised in the IC 100:
- an analyzer 110;
- other circuitry 115;
- a plurality of bond pads 130;
- a plurality of magnetic field sensing devices 105; and
- a background magnetic field sensing device 109.

For the sake of clarity of depiction, the electrically conducting connections between the above-listed components, such as electrically conducting connection 107 (FIG. 1), electrically conducting connection 120 (FIG. 1), and electrically conducting connection 145 (FIG. 1), are not depicted in FIG. 2.

The plurality of bond pads 130 serve to connect electric conductors comprised in the IC 100 to electric conductors comprised in the second circuit 135 of FIG. 1 (not shown in FIG. 2A).

The plurality of magnetic field sensing devices 105, which in this embodiment are GMR sensors, each have an axis of sensitivity, depicted by arrows 106, 107, 108, 111. Each of the axes of sensitivity is preferably oriented so as to attempt to maximize the sensitivity of the magnetic sensing device 105 to the magnetic field produced by an electric current 215 flowing through the electrical conductor 140. It is to be understood that alternative sensing devices, as described earlier, could be used, which do not have specific axes of sensitivity.

It is appreciated that the magnetic field sensing devices 105 may be disposed in various locations on or around the IC 100 depending on the application and configuration of the electrical conductor 140. Using more magnetic field sensing devices 105 makes undetected tampering with the IC 100 more difficult. Trade-off analysis must be performed by the system designer, balancing desired security with cost and difficulty of manufacture, which may both increase as the number of magnetic field sensing devices 105 used is increased. Further, complex routing of the electrical conductor 140, increases the complexity of the challenge to hackers seeking to elude tamper detection.

Figure 2B:
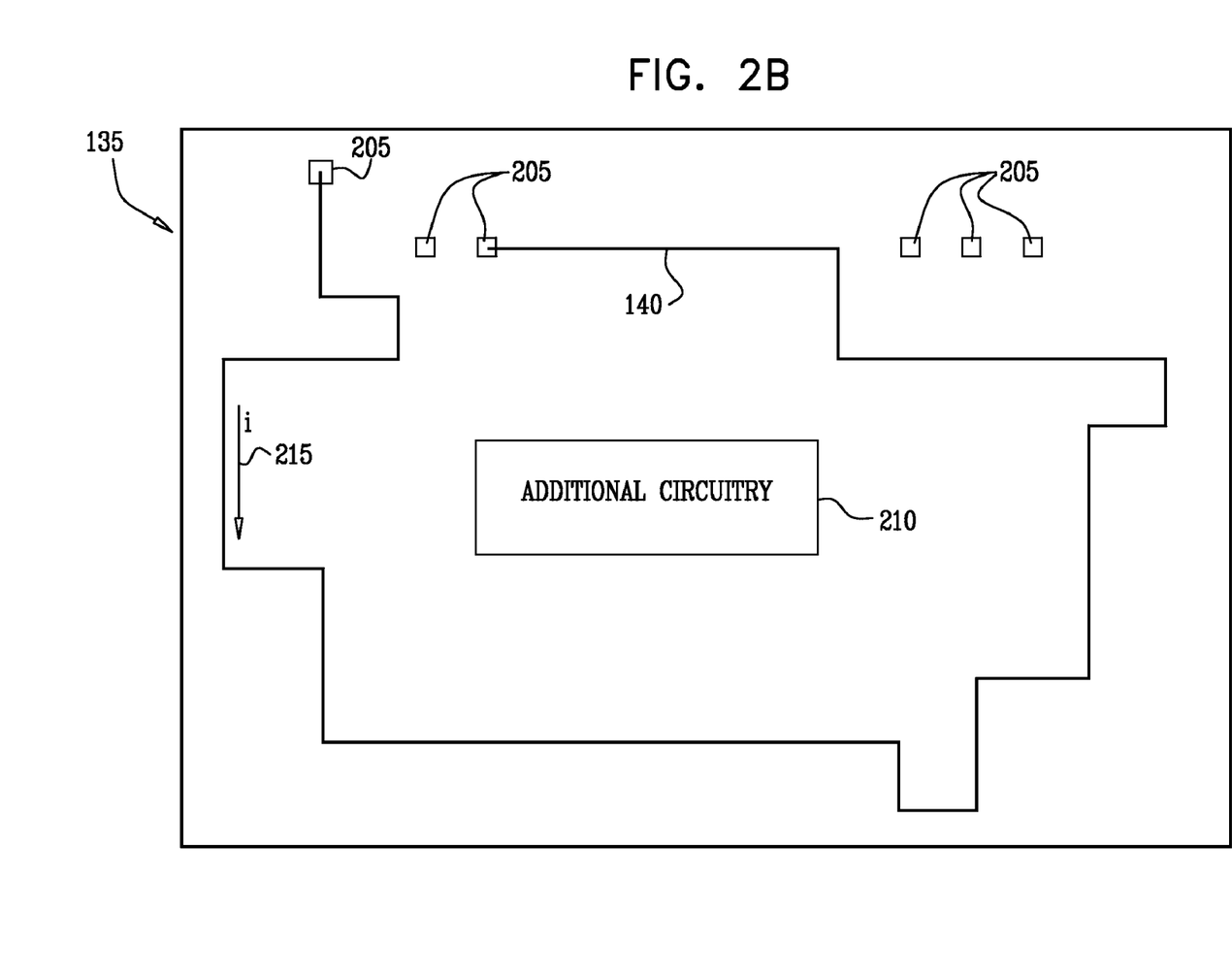
FIG. 2B is a simplified top view illustration of the second circuit 135 in accordance with the embodiment of FIG. 2A, including a depiction of additional circuitry 210, which may be included as part of the second circuit.

Reference is now made to FIG. 2B, which is a simplified top view illustration of the second circuit 135 in accordance with the embodiment of FIG. 2A, including a depiction of additional circuitry 210, which may be included as part of the second circuit FIG. 2B depicts the following components which are comprised in the second circuit 135:
- a plurality of bond pads 205;
- an electric conductor 140; and
- additional circuitry 210.

The additional circuitry 210 depicted may be present but is not relevant to the embodiments of the invention detailed herein.

FIG. 2B depicts a non-limiting example of a layout of the electric conductor 140 on the second circuit 135. The layout of electric conductor 140 is preferably designed so as to have the electric conductor 140 pass in close proximity of each of the magnetic field sensing devices 105 of FIG. 2A, in a direction such that the magnetic field caused by electric current 215 passing through the electric conductor 140 is in a direction of increased sensitivity of the magnetic field sensing devices 105.

In an embodiment of the present invention, the layout of the electrical conductor 140 is preferably such that the direction of maximum magnetic field strength is at different angles in different locations on the second circuit 135, so that not all of the directions are parallel to, or perpendicular to, the edges of the second circuit 135; such a layout is different from layouts generally used in printed circuit boards and ICs. The layout may be optimized for increased difficulty of undetectable tampering.

Figure 2C:
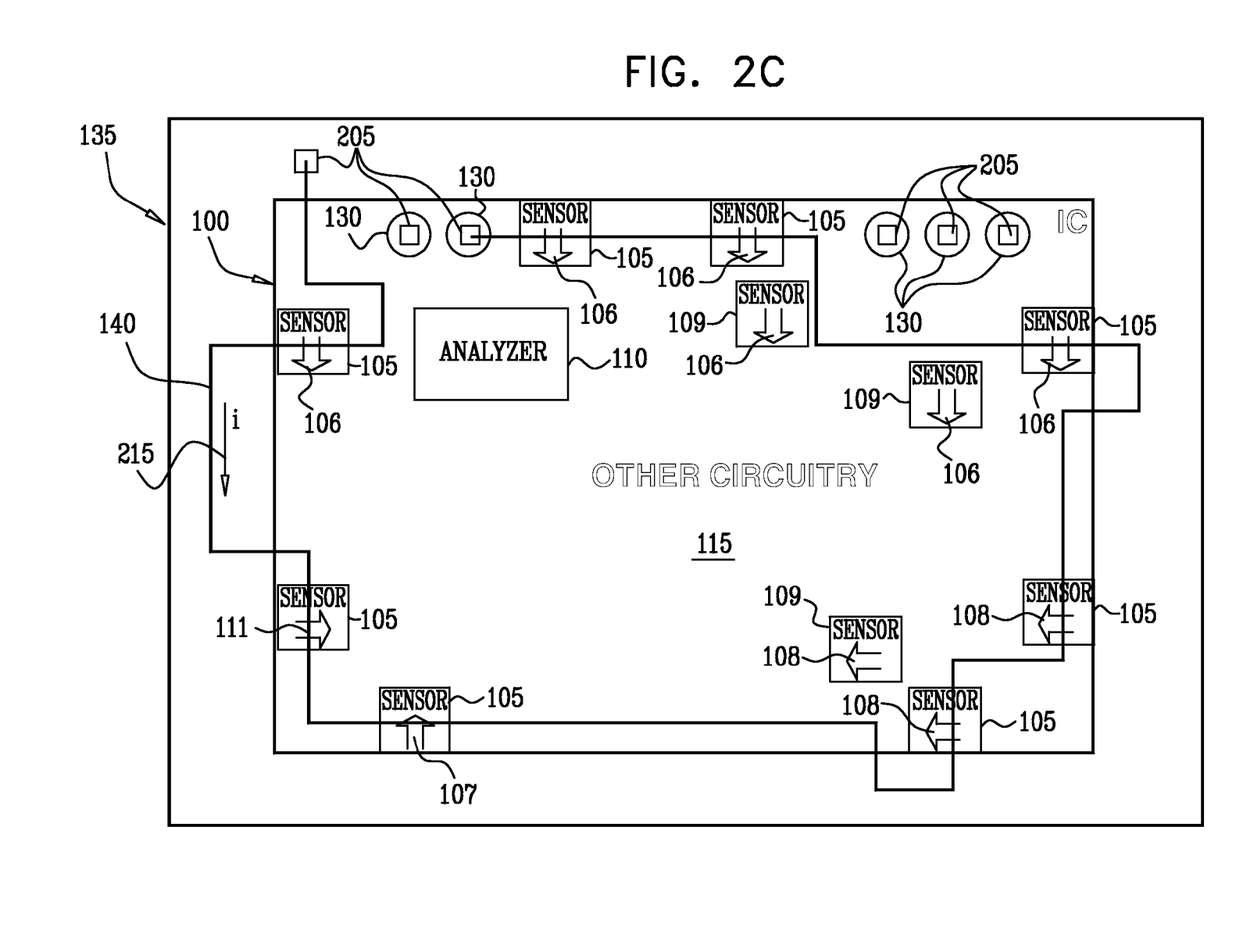
FIG. 2C is a simplified top view illustration of the IC 100, as depicted in FIG. 2A, overlaid on a top view of the second circuit 135, useful in understanding a spatial relationship between the IC 100 of FIG. 2A and the second circuit of FIG. 2B.

Reference is now made to FIG. 2C, which is a simplified top view illustration of the IC 100, as depicted in FIG. 2A, overlaid by a top view of the second circuit 135, useful in understanding a spatial relationship between the IC 100 of FIG. 2A and the second circuit 135 of FIG. 2B, as depicted in the embodiment of FIG. 1.

The layout of the electric conductor 140 is such that the electric conductor 140 passes over each of the magnetic field sensing devices 105 perpendicularly to the axis of sensitivity of the magnetic field sensing device 105. The magnetic field produced by an electric current 215 flowing through the electric conductor 140, being perpendicular to the direction of current flow according to the right-hand rule, as is well known in the art, thus coincides with the direction of the axis of sensitivity of the magnetic field sensing devices 105. The direction of the electric current flow is depicted in the directional vector of the electric current 215.

Many of the plurality of connections to bond pads 205 substantially overlap and are electrically connected to a plurality of bond pads 130, providing electrical connections between the second circuit 135 and the IC 100.

In this embodiment, the second circuit 135 and the IC 100 are preferably bonded to each other using flip chip technology, which places the second circuit 135 and the IC 100 face-to-face, and brings the electrical conductor 140 in close proximity to the magnetic field sensing devices 105.

It is appreciated that a tamperer, in removing a portion of the second circuit 135, comprising a portion of the electric conductor 140, from proximity with any one of the magnetic field sensing devices 105 causes a change in the magnetic field sensed by at least that one magnetic field sensing device 105. When the change in the magnetic field exceeds the pre-determined change described above with reference to FIG. 1, the analyzer 110, in some embodiments of the invention, indicates an alarm condition, and sends a signal to the other circuitry 115 to take defensive measures, as described above with reference to FIG. 1.

It is appreciated that instead of the electrical conductor 140 being routed to pass in proximity to each of the magnetic field sensing devices 105, the electrical conductor 140 may be routed to pass in proximity to only some of the magnetic field sensing devices 105. Other conductors comprised in the second circuit 135 may be routed to pass in proximity to others of the magnetic field sensing devices 105.

In embodiments of the invention, the electric current 215 flowing in conductor 140 provides supply current to the IC 100. In other embodiments, the electric current 215 flowing in conductor 140 provides a signal to the IC. In either case, during the at least one period of time the electric current 215 flowing in conductor 140 is of known strength. In still other embodiments, where the second circuit 135 is not operatively connected to the IC 100, nothing is provided to the IC 100 via the conductor 140 other than a magnetic field to sense using the magnetic sensing devices 105.

An example calculation will now be made, without limiting the generality of the foregoing, of typical values expected in an embodiment of the present invention. The example references FIG. 1 and FIGS. 2A-2C.

By way of a non-limiting example, the distance between the magnetic field sensing device 105 and the electrical conductor 140 is taken to be 200 micrometers.

A typical electrical conductor 140 such as a Vcc line on a Printed Circuit Board (PCB) is preferably chosen to be a source of the magnetic field because the Vcc line typically carries the highest current of the various electric conductors comprised in the second circuit 135, thereby producing the largest magnetic field.

The following equation is used to calculate the magnetic field strength at the magnetic field sensing device 105:

$$H=I/(2\pi L) \qquad \text{(Equation 1)}$$

Where H is magnetic field strength in units of amperes/meter, I is current in units of amperes, and L is the distance of the magnetic field sensing device 105 from the electric conductor 140 in units of meters.

Calculating the magnetic field strength at the magnetic field sensing device 105 based on assumptions of the present non-limiting example (I=40 milliamperes and L=200 micrometers) provides:

$$H=I/(2\pi L)=40\times 10^{-3}/(2\pi 200\times 10^{-6})=31.8 \text{ amperes/meter} \qquad \text{(Equation 2)}$$

If the conductor producing the magnetic field is removed to a distance of 1 millimeter, or 1000 micrometers, then the magnetic field strength would diminish to 6.4 amperes/meter, producing a reduction in the measured magnetic field of 80%. In contrast, a decrease of the distance to 40 micrometers, as is common in flip-chip technology today, would increase by 500% the measured magnetic field strength to 159.2 amperes/meter.

Similarly, at a distance of 40 micrometers, increasing the current in the example from 40 milliamperes to 200 milliamperes would increase by a further 500% the measured magnetic field to 796.0 amperes/meter.

Persons skilled in the art will appreciate that in a case where the second circuit 135 comprises a printed circuit board (PCB), the electrical conductor 140 may be routed on the side of the PCB which is proximate to the IC 100, or on the side of the PCB which is distant from the IC 100, or any PCB layer in between.

An embodiment of the present invention places the electrical conductor 140 on the side of the PCB which is proximate to the IC 100, in order to produce a greater magnetic field at the magnetic field sensing device 105. Persons skilled in the art will appreciate that the closer the distance between the electrical conductor 140 and the magnetic field sensing device 105, the greater the sensed magnetic field, thereby producing greater absolute changes in the output of the magnetic field sensing device in response to relative movement of the IC 100 and the second circuit 135.

In another embodiment of the present invention, the IC 100 and the second circuit 135 would be connected face to face, in a flip chip arrangement, and the above-mentioned distance would be typically smaller than the 200 micrometers used in the example calculation, making for a larger magnetic field at the magnetic field sensing device 105, and easier detection of the magnetic field and changes thereof.

It is to be appreciated that the Earth's magnetic field should also typically be taken into account. The Earth's magnetic field strength typically ranges from 15 to 60 amperes/meter, and is thus typically in the same order of magnitude as the magnetic field produced by current in the example above. Persons skilled in the art will appreciate that the magnetic field measured by the magnetic field sensing device 105 is the sum of the magnetic field produced by electric current 215 in the electrical conductor 140 and the background magnetic field produced by the Earth. Changes in location and rotation of the IC 100 generally change the background portion of the magnetic field measured by the magnetic field sensing device 105, thereby affecting determination of changes in the magnetic field.

An embodiment of the present invention comprises a background magnetic field sensing device 109 in the IC 100, the background magnetic field sensing device 109 preferably being placed substantially distant from current conductors which carry significant currents. Persons skilled in the art will appreciate that in the IC 100, as well as in the second circuit 135, some current conductors carry larger currents than other current conductors. The background magnetic field sensing device 109 is arranged to measure the background magnetic field, comprising the Earth's magnetic field among others. In such an embodiment, the analyzer 110 further comprises a differentiator (not shown) which is arranged to compare the magnetic field measured by the magnetic field sensing device 105 with the magnetic field measured by the background magnetic field sensing device 109, thereby enabling differentiation between changes in the magnetic field produced by electric current 215 in the electrical conductor 140 and changes in the sensed background magnetic field. Further embodiments comprise more than one background magnetic field sensing device 109. In embodiments in which the magnetic field sensing devices 105 are GMR sensors, the background magnetic field sensing devices 109 are preferably GMR sensors as well. As described previously, each GMR sensor has an axis of sensitivity, depicted by arrows 106, 107, 108. Each of the axes of sensitivity of the background magnetic field sensing devices 109 is preferably oriented so as to attempt to match the axis of sensitivity of the nearest magnetic sensing device 105, in order to facilitate the differentiation performed in some embodiments of the analyzer 100, as described above. It is to be understood that alternative sensing devices, as described earlier, could be used, which do not have specific axes of sensitivity.

In an alternative embodiment of the present invention, there is no background magnetic field sensing device in the IC 100. In such a case, the IC 100 enters a tamper test mode during which the strength of the electric current 215 flowing in conductor 140 changes in a predetermined time dependent fashion at two or more known levels of current during a substantially short period of time. The changes can be directly controlled by the IC 100 or controlled externally. Persons skilled in the art will appreciate that the magnetic field produced by the levels of current consumption is proportional to the levels of current consumption, while the background magnetic field comprising Earth's magnetic field is substantially constant during the substantially short period of time. The analyzer 110 further comprises a differentiator (not shown) which compares the levels of magnetic field at the two or more levels of current consumption, thus differentiating between changes in the magnetic field produced by electric current 215 in the electrical conductor 140 and changes due to the sensed background magnetic field. The time dependent changes also increase significantly the difficulty to bypass the tamper detection.

Methods for controlling levels of current in conductors are well known in the art. In embodiments of the invention in which IC 100 controls changes in the level of electric current 215 in the at least one conductor 140, non-limiting examples of such methods include: selectively enabling functions incorporated in the IC 100 which require more current; enabling a connection between Vcc and ground through a load; and increasing the clock speed.

In yet another alternative embodiment of the present invention both the at least one background magnetic field sensing device and two or more levels of current consumption as described above are used to differentiate between changes in the magnetic field produced by electric current 215 in the electrical conductor 140 and changes due to the sensed background magnetic field.

It is to be appreciated that, while the non-limiting examples described previously show the second circuit 135 electrically connected to the IC 100, that is not necessarily the case. The IC 100 could be mounted proximate to the second circuit 135 without their being electrically connected. As long as the strength of the electrical electric current 215 flowing in the conductor 140 during normal, untampered with, operation is known beforehand and the resultant magnetic field strength generated thereby, as measured by the magnetic field sensing devices 105, is likewise known beforehand, the lack of an electrical connection between the IC 100 and the second circuit 135 is not critical.

An embodiment of the present invention uses a Wheatstone bridge circuit, as is well known in the art, to detect changes in resistance of the magnetic field sensing devices 105.

Figure 3:
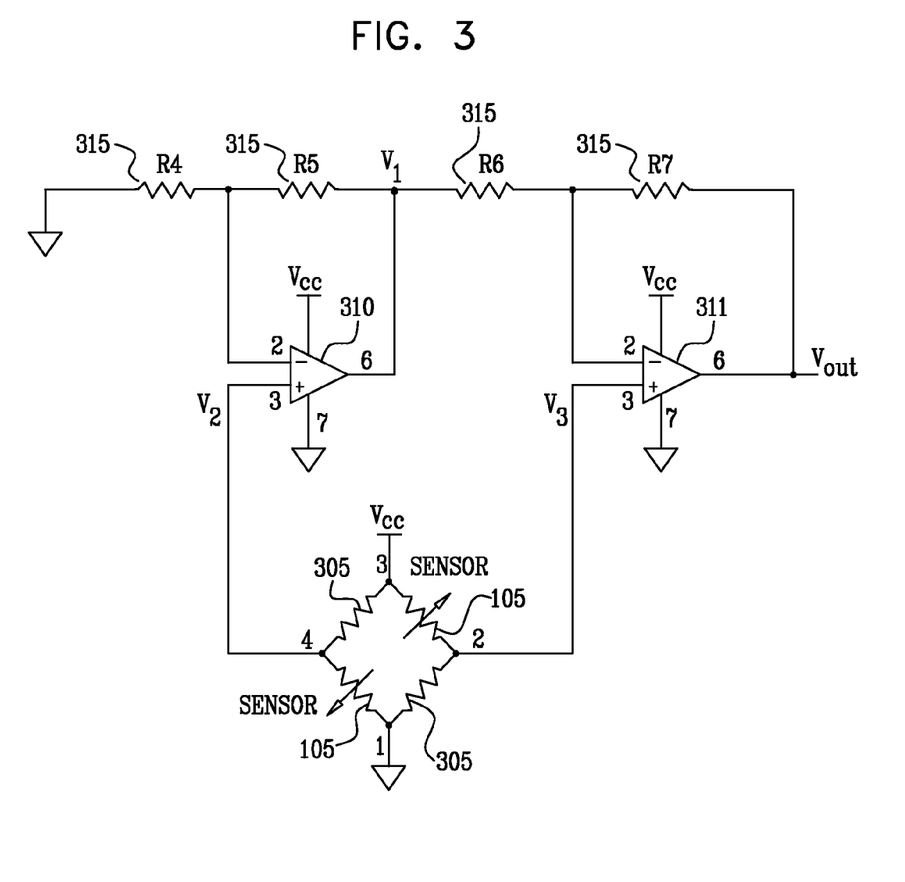
FIG. 3 is a schematic view of a portion of an analyzer of the IC of FIG. 1. said portion being known in the art.

Reference is now made to FIG. 3, which is a schematic view of a portion of an analyzer 110 of the IC 100 of FIG. 1, the portion using magnetic field sensing devices 105 in a Wheatstone bridge configuration to sense changes in electric resistance of the magnetic field sensing devices 105.

FIG. 3 depicts two magnetic field sensing devices 105 and two reference resistors 305 in a Wheatstone bridge configuration; and two operational amplifiers 310 and 311, and four resistors 315, electrically interconnected as is well known in the art.

The magnetic field sensing devices 105 of the depicted embodiment are GMR sensing devices, the GMR sensing devices being magnetic field sensing devices 105 in which electric resistance changes as a function of magnetic field.

The portion of the analyzer 110 is preferably arranged such that both magnetic field sensing devices 105 are in a substantially similar magnetic field. The magnetic field sensing devices 105 are preferably located in similar proximity to the same electric conductor 140. A change in the magnetic field at the magnetic field sensing devices 105 produces changes in the resistance of the magnetic field sensing devices 105. The changes in resistance are preferably substantially equal in both of the magnetic field sensing devices 105. In any case, the changes in the resistance of the magnetic field sensing devices 105 are preferably in similar directions, that is, both of the magnetic field sensing devices 105 increasing resistance or both decreasing resistance.

It will be appreciated by persons skilled in the art that due to the Wheatstone bridge arrangement using two magnetic field sensing devices 105, as depicted in FIG. 3, the Wheatstone bridge output is twice the Wheatstone output of a Wheatstone bridge with only one magnetic field sensing device 105.

An example calculation of the output voltage $V_{out}$ of the Wheatstone bridge circuit will now be made, without limiting the generality of the foregoing:

An embodiment of the present invention uses $R_7=R_4$ and $R_5=R_6$. Persons skilled in the art will appreciate that $V_{out}$, under the above-mentioned values of $R_4$, $R_5$, $R_6$, and $R_7$, is:

$$V_{out} = (V_3 - V_2) * \left(1 + \frac{R_4}{R_5}\right) \quad \text{(Equation 3)}$$

In the example described above, when both of the magnetic field sensing devices 105 change resistance in similar directions, $V_2$ and $V_3$ both change value in opposite directions. When, by way of a non-limiting example, $R_4=R_5$, $V_{out}$ changes by twice the change in $(V_3-V_2)$.

It is further well known in the art to utilize additional circuitry as necessary to practice the invention as embodied herein in its alternate configurations. The use of electrical biasing, both AC and DC; magnetic biasing; pre-amplification; amplification etc. (not shown) are all well known in the art and discussed in many of the references herein incorporated. Furthermore, separate power regulators (not shown), as well known in the art, may be provided to supply power to all or some of the magnetic field sensors 105 and background magnetic field sensing devices 109 for additional noise immunity, increased sensitivity, etc.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. Apparatus for detecting tampering with an integrated circuit (IC), the apparatus comprising:
    a second circuit comprising at least one conductor for conducting electrical current, the electrical current comprising, during at least one period of time, current of known strength, the electrical current generating a magnetic field;
    at least one magnetic field sensing device operatively associated with the IC, said sensing device having at least one electrical characteristic responsive to changes in a sensed magnetic field, said magnetic field sensing device being positioned so as to sense the magnetic field generated by current in the at least one conductor; and
    an analyzer operatively associated with said at least one magnetic field sensing device and the IC, said analyzer determining that the IC is being tampered with based, at least in part, on changes in the at least one electrical characteristic of said at least one magnetic field sensing device in response to changes in said sensed magnetic field generated by the electrical current in the at least one conductor during said at least one period of time,
    wherein the second circuit is operatively associated with the IC and the strength of the electrical current of known strength is controlled by the IC.

2. The apparatus according to claim 1, wherein the electrical current further comprises, during at least a second period of time, current of unknown strength.

3. The apparatus according to claim 1, wherein said determining is based, at least in part, on said changes differing from predetermined values.

4. The apparatus according to claim 3, wherein said determining is based, at least in part, on said changes exceeding a predetermined threshold.

5. The apparatus according to claim 1, wherein said determining is based, at least in part, on data generated by other tamper detection sensing devices.

6. The apparatus according to claim 1, wherein the electrical current of known strength varies in a time-dependent fashion.

7. The apparatus according to claim 6, wherein said analyzer further comprises a differentiator operative to differentiate between sensed background magnetic fields and sensed magnetic fields generated by the electrical current of known strength in the at least one conductor, wherein said differentiation is based, at least in part, on the time dependent variation of the electrical current of known strength.

8. The apparatus according to claim 1, wherein the electrical current of known strength is constant.

9. The apparatus according to claim 1, wherein the at least one magnetic field sensing device comprises a plurality of magnetic field sensing devices, said analyzer being operatively associated with said plurality of magnetic field sensing devices and wherein said analyzer determines that the IC is being tampered with based, at least in part, on changes in the at least one electrical characteristic of said multiple magnetic field sensing devices in response to changes in said sensed magnetic fields generated by the electrical current in the at least one conductor during said at least one period of time.

10. The apparatus according to claim 9, wherein the at least one conductor comprises a plurality of conductors.

11. The apparatus according to claim 9, wherein at least one of said multiple magnetic field sensing devices senses background magnetic fields and said analyzer further comprises a differentiator operative to differentiate between sensed background magnetic fields and sensed magnetic fields generated by the electrical current in the at least one conductor, during said at least one period of time, using said at least one sensing device sensing background magnetic fields, wherein said differentiation is performed using the at least one electrical characteristic of said at least one sensing device sensing background magnetic fields.

12. The apparatus according to claim 1, wherein the at least one magnetic field sensing device is selected from the group consisting of a hall effect sensor, a GMR sensor, a spin transistor based sensor, and a magnetic tunnel junction sensor.

13. The apparatus according to claim 1, wherein the at least one magnetic field sensing device is manufactured separately from the IC and subsequently mounted on a surface of the IC.

14. The apparatus according to claim 1, wherein the at least one magnetic field sensing device is integrally manufactured within the IC.

15. The apparatus according to claim 1, wherein the at least one conductor provides supply current to the IC.

16. The apparatus according to claim 1, wherein the at least one conductor provides a signal to the IC.

17. The apparatus according to claim 1, wherein the IC takes at least one defensive measure in response to said analyzer determining that the IC is being tampered with.

18. A method for detecting tampering with an integrated circuit (IC), the method comprising:
    providing an electrical current in at least one conductor in a second circuit, the electrical current being of known strength during at least one period of time, the electrical current generating a magnetic field;
    sensing the magnetic field generated by current in the at least one conductor;
    determining that the IC is being tampered with based on changes in said sensed magnetic field generated by the electrical current in the at least one conductor during said at least one period of time; and enabling the IC to control the strength of said electrical current of known strength.

19. The method according to claim 18, wherein the electrical current further comprises, during at least a second period of time, current of unknown strength.

20. The method according to claim 18, wherein said determining is based, at least in part, on said changes differing from predetermined values.

21. The method according to claim 20, wherein said determining is based, at least in part, on said changes exceeding a predetermined threshold.

22. The method according to claim 18, wherein said determining is based, at least in part, on data generated by other tamper detection sensing devices.

23. The method according to claim 18, said method further comprising varying the electrical current of known strength in a time-dependent fashion.

24. The method according to claim 23, said determining further comprising differentiating between sensed background magnetic fields and sensed magnetic fields generated by the electrical current, wherein said differentiation is based, at least in part, on the time dependent variation of the electrical current during said at least one period of time.

25. The method according to claim 18, wherein the electrical current of known strength is constant.

26. The method according to claim 18, said method further comprising sensing in a plurality of locations, and said determining is based on changes in said sensed magnetic field generated by the electrical current in the at least one conductor sensed at said plurality of locations during said at least one period of time.

27. The method according to claim 26, wherein the at least one conductor comprises a plurality of conductors.

28. The method according to claim 26, said determining further comprising differentiating between sensed background magnetic fields and sensed magnetic fields generated by the electrical current, wherein said differentiation is based, at least in part, on said sensing in a plurality of locations including sensing background magnetic fields during said at least one period of time.

29. The method according to claim 18, said method further comprising the at least one conductor providing supply current to the IC.

30. The method according to claim 18, said method further comprising the at least one conductor providing a signal to the IC.

31. The method according to claim 18, said method further comprising taking at least one defensive measure in response to determining that the IC is being tampered with.

32. A tamper detecting system comprising:
an integrated circuit (IC);
a second circuit comprising at least one conductor for conducting electrical current, the electrical current comprising, during at least one period of time, current of known strength, the electrical current generating a magnetic field;
at least one magnetic field sensing device operatively associated with the IC, said sensing device having at least one electrical characteristic responsive to changes in a sensed magnetic field, said magnetic field sensing device being positioned so as to sense the magnetic field generated by current in the at least one conductor; and
an analyzer operatively associated with said at least one magnetic field sensing device and the IC, said analyzer determining that the IC is being tampered with based, at least in part, on changes in the at least one electrical characteristic of said at least one magnetic field sensing device in response to changes in said sensed magnetic field generated by the electrical current in the at least one conductor during said at least one period of time,
wherein the electrical current of known strength varies in a time-dependent fashion.

33. The system according to claim 32, wherein the electrical current further comprises, during at least a second period of time, current of unknown strength.

34. The system according to claim 32, wherein said determining is based, at least in part, on said changes differing from predetermined values.

35. The system according to claim 33, wherein said determining is based, at least in part, on said changes exceeding a predetermined threshold.

36. The system according to claim 32, wherein said determining is based, at least in part, on data generated by other tamper detection sensing devices.

37. The system according to claim 32, wherein the second circuit is operatively associated with the IC and the strength of the electrical current of known strength is controlled by the IC.

38. The system according to claim 32, wherein said analyzer further comprises a differentiator operative to differentiate between sensed background magnetic fields and sensed magnetic fields generated by the electrical current of known strength in the at least one conductor, wherein said differentiation is based, at least in part, on the time dependent variation of the electrical current of known strength.

39. The system according to claim 32, wherein the at least one magnetic field sensing device comprises a plurality of magnetic field sensing devices, said analyzer being operatively associated with said multiple magnetic field sensing devices and wherein said analyzer determines that the IC is being tampered with based, at least in part, on changes in the at least one electrical characteristic of said multiple magnetic field sensing devices in response to changes in said sensed magnetic fields generated by the electrical current in the at least one conductor during said at least one period of time.

40. The system according to claim 39, wherein the at least one conductor comprises a plurality of conductors.

41. The system according to claim 39, wherein at least one of said multiple magnetic field sensing devices senses background magnetic fields and said analyzer further comprises a differentiator operative to differentiate between sensed background magnetic fields and sensed magnetic fields generated by the electrical current in the at least one conductor, during said at least one period of time, using said at least one sensing device sensing background magnetic fields, wherein said differentiation is performed using the at least one electrical characteristic of said at least one sensing device sensing background magnetic fields.

42. The system according to claim 32, wherein the at least one magnetic field sensing device is selected from the group consisting of a hall effect sensor, a GMR sensor, a spin transistor based sensor, and a magnetic tunnel junction sensor.

43. The system according to claim 32, wherein the at least one magnetic field sensing device is manufactured separately from the IC and subsequently mounted on a surface of the IC.

44. The system according to claim 32, wherein the at least one magnetic field sensing device is integrally manufactured within the IC.

45. The system according to claim 32, wherein the at least one conductor provides supply current to the IC.

46. The system according to claim 32, wherein the at least one conductor provides a signal to the IC.

47. The system according to claim 32, wherein the IC takes at least one defensive measure in response to said analyzer determining that the IC is being tampered with.

48. The system according to claim 47, wherein said at least one defensive measure is selected from the group consisting of:
   a) the IC not entering a normal operation mode;
   b) shutting down some or all operation of the IC;
   c) disabling the IC;
   d) not distributing a clock signal to the IC;
   e) erasing at least a first part of data stored in the IC;
   f) making at least a second part of data stored in the IC inaccessible;
   g) the IC providing nonsense data to be read out, replacing, at least in part, valid data to be read out;
   h) the IC continuing to operate normally, subtly altering stored data, at least in part, thereby functioning as a silent alarm;
   i) the IC setting an indicator, by storing a value in the IC, indicating that the analyzer produced a signal indicating detection of movement of the IC relative to the second circuit; and
   j) the IC setting an indicator, by blowing a fuse in the IC, indicating that the analyzer produced a signal indicating detection of movement of the IC relative to the second circuit.

49. The system according to claim 32, wherein the IC is a bare die.

50. The system according to claim 32, wherein the IC is a packaged die.

51. The system according to claim 32, wherein said second circuit is selected from the group consisting of:
   a) a smartcard substrate;
   b) a hybrid substrate;
   c) an element in a multi-chip module;
   d) a printed circuit board; and
   e) an electrically conducting material.

52. The system according to claim 32, wherein the IC is physically attached to a supporting member.

53. The system according to claim 52, wherein said supporting member comprises said second circuit.

* * * * *